(12) United States Patent
Zimmer et al.

(10) Patent No.: US 11,453,153 B2
(45) Date of Patent: *Sep. 27, 2022

(54) BOTTLE, METHOD OF MAKING THE SAME AND USE OF FDCA AND DIOL MONOMERS IN SUCH BOTTLE

(71) Applicant: SOCIETE DES PRODUITS NESTLE S.A., Vevey (CH)

(72) Inventors: Johannes Zimmer, Lausanne (CH); Nicolas Dabrowski, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 101 days.

This patent is subject to a terminal disclaimer.

(21) Appl. No.: 16/771,996

(22) PCT Filed: Dec. 11, 2018

(86) PCT No.: PCT/EP2018/084366
§ 371 (c)(1),
(2) Date: Jun. 11, 2020

(87) PCT Pub. No.: WO2019/115530
PCT Pub. Date: Jun. 20, 2019

(65) Prior Publication Data
US 2020/0391431 A1  Dec. 17, 2020

(30) Foreign Application Priority Data

Dec. 15, 2017 (EP) .................................. 17207643

(51) Int. Cl.
B65D 1/02  (2006.01)
B29C 49/00  (2006.01)
(Continued)

(52) U.S. Cl.
CPC .......... B29C 49/0005 (2013.01); B29B 11/14 (2013.01); B29C 49/06 (2013.01);
(Continued)

(58) Field of Classification Search
CPC . B29C 49/0005; B29C 49/06; B29C 49/0073; B29C 2049/0089; C08L 67/02;
(Continued)

(56) References Cited

U.S. PATENT DOCUMENTS 5,850,932 A   12/1998  Beck et al.
6,296,471 B1  10/2001  Cheng et al.
(Continued)

FOREIGN PATENT DOCUMENTS

WO    2014032730      3/2014
WO    WO2015/031907  *  3/2015  ............. B29B 11/14

OTHER PUBLICATIONS

EPO Application 18812211: Applicant letter dated Jan. 27, 2021.*
(Continued)

*Primary Examiner* — Monica A Huson
(74) *Attorney, Agent, or Firm* — K&L Gates LLP

(57) ABSTRACT

The invention concerns a bottle (1) molded from at least one thermoplastic polymer of at least one Furan Dicarboxylic Acid (FDCA) monomer, preferably 2,5-Furan Dicarboxylic Acid (2,5-FDCA) monomer, and at least one diol monomer, preferably Monoethyleneglycol (MEG) monomer, said bottle, having a main axis (X), being provided with a body (5) and a bottom base (6) extending from a lower end of the body (5), The bottom base (6) comprises: —a peripheral seat (7) defining a laying plane (8); —a concave arch (10) which extends from the periphery of a central zone (11) of the bottom base (6) to the peripheral seat (7), said concave arch (10) having a rounded general shape with a concavity turned towards the outside of the container (1) and the middle point
(Continued)

of the central zone (11) being named push-up (11a); —a series of reinforcing grooves (13) which extend radially from the central zone (11) to at least the peripheral seat (7); —base feet (14) located between two adjacent reinforcing grooves (13); According to the invention, the bottle bottom base (6) comprises a push-up height, defined as the height between the push-up (11a) and the laying plan (8), that is in the range of 7 to 10 mm for a bottle having a diameter (D) between 40 and 150 mm.

11 Claims, 5 Drawing Sheets

(51) Int. Cl.
  *B29B 11/14* (2006.01)
  *B29C 49/06* (2006.01)
  *C08G 63/672* (2006.01)
  *C08L 67/02* (2006.01)
  *B29K 67/00* (2006.01)
  *B29L 31/00* (2006.01)

(52) U.S. Cl.
  CPC .......... *B29C 49/071* (2022.05); *B65D 1/0207* (2013.01); *B65D 1/0284* (2013.01); *C08G 63/672* (2013.01); *C08L 67/02* (2013.01); *B29C 2949/0747* (2022.05); *B29C 2949/08* (2022.05); *B29C 2949/0826* (2022.05); *B29K 2067/003* (2013.01); *B29L 2031/7158* (2013.01)

(58) Field of Classification Search
  CPC ............... C08G 63/672; B65D 1/0207; B29B 2911/14345; B29B 2911/1476; B29B 2911/14693; B29L 2031/7158; B29K 2067/00
  See application file for complete search history.

(56) References Cited

U.S. PATENT DOCUMENTS

| | | |
|---|---|---|
| 2016/0244197 A1 | 8/2016 | Hermel |
| 2017/0066875 A1 | 3/2017 | Sipos et al. |
| 2020/0391430 A1* | 12/2020 | Zimmer .............. B29C 49/0005 |

OTHER PUBLICATIONS

Gandini et al. "Rapid Communication—The Furan Counterpart of Poly(ethylene terephthalate): An Alternative Material Based on Renewable Resources" Journal of Polymer Science: Part A: Polymer Chemistry, 2009, vol. 47, pp. 295-298.
European Patent Office Communication for Application No. 18812211.3-1014, dated Jun. 17, 2022, 7 pages.

* cited by examiner

BOTTLE, METHOD OF MAKING THE SAME AND USE OF FDCA AND DIOL MONOMERS IN SUCH BOTTLE

CROSS REFERENCE TO RELATED APPLICATIONS

The present application is a National Stage of International Application No. PCT/EP2018/084366, filed on Dec. 11, 2018, which claims priority to European Patent Application No. 17207643.2, filed on Dec. 15, 2017, the entire contents of which are being incorporated herein by reference

FIELD OF THE INVENTION

The invention relates to a bottle having a bottom base, to a method of making the same and to a use of FDCA and diol monomers in such bottle and bottle bottom base.

BACKGROUND

PolyEthylene Terephthalate and its co-polyesters (hereinafter referred to collectively as "PET" or "PolyEthylene Terephthalate") are widely used as raw material for making packaging articles in part due to their excellent combination of clarity, mechanical, and gas barrier properties. Examples of PET products include, but are not limited to, bottles and containers for packaging food and beverage products but also detergent, cosmetics or pharmaceutical products. PET is also widely used in the fiber industry.

Depending on its processing and thermal history, PET may exist both as an amorphous (transparent) and as a semi-crystalline polymer. The semi crystalline material might appear transparent (particle size less than 500 nm) or opaque and white (particle size up to a few micrometers) depending on its crystal structure and particle size.

The wide use of PET in the blow molding industry and more specifically in the water bottle industry has led to the development of specific processes: injection molding of preforms, preforms heating process, stretch blow molding, liquid bi-orientation . . . . Complementary to the processes, specific devices have been developed, for example, injection molding molds, heating devices, sliding rod for stretching the preform . . . .

Today, most commercial methods produce PET with petro-chemically derived raw materials. However, there is a high demand for polymers based on renewable raw materials, that can be efficiently bio-sourced and that are cost effective to compete PET.

In PET thermoplastic containers and bottles, the design of the bottle base is crucial to enable containers to withstand internal pressures as exposed to carbonated drinks or temperature increases for example. A known challenge for bottle base is thereby to avoid a pop-out of the base centre at high pressures or temperatures because the bottle will consequently no longer be able to stand on the base.

The use of PET for making bottle using stretch blow molding process limits the possibility of bottle base design due to the physical and chemical properties of PET.

For example, in the case of carbonated products, to withstand the internal pressure due to the carbonation, the base center is designed to be higher than the base feet. However, the height difference between the base center and its feet is limited by the stretchability of PET due to its elongation at break and the strain hardening effect which prevents the PET from being further stretched.

The use of other thermoplastic polymers may help shifting these limits.

A promising polymer discovered in the fifties has recently come back to interest. PolyEthylene Furanoate and its co-polymers (hereinafter referred to collectively as "PEF") is a polymer that can be at least partially biosourced.

PEF is a polymer prepared by esterification of the 2,5-furandicarboxylate moiety [2,5-Furandicarboxylic acid (FDCA) or dimethyl-2,5-furandicarboxylate (DMF)] and condensation of the ester with a diol or polyol (ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydrofuran), glycerol, pentaerythritol). Some of these acid and alcohol moieties can be obtained from renewable crop raw material.

One proposed PEF is a polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer.

Document WO 2010/077133 A1 describes an optimized processes for making a PEF polymer having a 2,5-furandicarboxylate moiety within the polymer backbone.

The preparation of a PEF polymer for bottle application is also presented in document EP 2 890 544 A1.

In addition to being possibly obtained from renewable raw material and to having similar if not better mechanical and thermal properties, PEF has superior barrier properties than PET ($O_2$ barrier: 10× improvement, $H_2O$ barrier: 2× improvement, $CO_2$ barrier: 4× improvement) and is recyclable.

Additionally, PEF has a crystallization time that it 10 times longer than the one of PET and the crystallization occurs at higher temperature (130 to 150° C. for PEF instead of 100 to 120° C. for PET).

In this frame, the use of PEF has been explored.

It has been disclosed that some bottles made of PEF have been made. Said bottles are however believed to be quite basic in some of their structural parameters. There is a need for advanced bottles.

It is therefore an object of the present invention to propose a bottle, and associated method, made from PEF polymer with improved structural parameters.

SUMMARY OF THE INVENTION

The Bottle

In this respects, the invention provides a bottle molded from at least one thermoplastic polymer of at least one Furan Dicarboxylic Acid (FDCA) monomer, preferably 2,5-Furan Dicarboxylic Acid (2,5-FDCA) monomer, and at least one diol monomer, preferably Monoethyleneglycol (MEG) monomer, said bottle, having a main longitudinal axis, being provided with a body and a bottom base extending from a lower end of the body, the bottom base comprising a peripheral seat defining a laying plane; a concave arch which extends from the periphery of a central zone of the bottom base to the peripheral seat, said concave arch having a rounded general shape with a concavity turned towards the outside of the container and the middle point of the central zone being named push-up; a series of reinforcing grooves which extend radially from the central zone to at least the peripheral seat; base feet located between two adjacent reinforcing grooves, and presenting the features of claim 1.

Specifically, the proposed bottle comprises a push-up height, defined as the height between the push-up and the laying plan, which is in the range of 7 to 10 mm for a bottle having a diameter D between 40 and 150 mm.

The thermoplastic polymer made of FDCA and diol monomers, such as polyethylene furanoate (PEF), has been surprisingly found to allow an improved blowability of the base of the bottle compared to PET. In particular, the thermoplastic polymer of the invention showed an enhanced ability to follow a base profile of a mold thereby making it possible to get some smaller and more precise features onto the bottle base. Without intending to be bound to any theory, it is believed that due to its flow and regularity features, PET limits the kind of imprints that can be molded, especially for bottle base parameters of small dimensions.

Thanks to these new technical features of the proposed bottle base it makes it possible to improve pressure resistance of the bottle and particularly of the bottom base while allowing a great number of design for the other parameters of the bottom base (reinforcing grooves profile, number of feet . . . ).

Indeed, having a quite important push-up height of the base allows to increase the initial and final base clearance compared to a standard push-up height and therewith to withstand higher internal over-pressure without risking a roll-out of the base. This parameter improves the quality of the base and diminish waste for quality issue.

In addition, thanks to this important push-up height, the proposed bottle withstands pressures that can be higher than the ones that conventional bottles may withstand. Indeed, the proposed bottle may withstands more than 30% higher pressure values than a conventional bottle using the geometrical constraints imposed by the usage of PET.

According to an additional feature, the number of reinforcing grooves may vary from 5 to 10, preferably from 7 to 10. It is to be noted that a high number of reinforcing grooves also participates in increasing the pressure resistance of the bottle base.

This allows further improving the quality of the bottle, especially for a pressurized bottle.

Advantageously, the reinforcing grooves have a groove radius comprised within the range from 1 mm to 6 mm, preferably between 1 mm to 3 mm.

The groove radius is defined as the radius of groove in the bottom of the groove. The proposed base has a groove radius that may be smaller than conventional ones used in PET thermoplastic bottle base while still allowing good blowability thanks to use of PEF.

The proposed bottle further comprises from 5 to 10 base feet, preferably from 7 to 10 base feet.

The base feet have a radius at their contact point with the laying plan that is from 1 to 8 mm, preferably between 1 to 5 mm.

This base feet radius is the radius of the base feet at the ground contact. The base feet radius is smaller than conventional base feet radii of PET thermoplastic bottle bases and thus it is possible to improve the stability angle of the bottle as the feet standing ring diameter is increased.

The proposed bottle has preferably an internal volume between 15 to 350 cl with classical bottle shape. Indeed, containers with higher volumes may have different features for their base.

According to a particular feature, the claimed bottle with proposed bottle base is filled with a pressurized liquid, preferably a beverage.

For instance, said beverage is a carbonated beverage. Alternatively, the beverage may also be a beverage under nitrogen atmosphere.

The beverage that is filled in the bottles may be for example carbonated water. The beverage may be an alcoholic beverage such as beer. The beverage may also be a soda, for example, a cola beverage, preferably carbonated. The beverage may also be a fruit juice, under nitrogen atmosphere. The beverage may additionally be a pressurized vitamin water or an energy drink or any other pressurized beverage.

The newly proposed based allows improving both the pressure resistance and the stability of the bottle during manufacturing, processing and storage while having good processability in term of blow-molding.

Indeed, the ability of the thermoplastic polymer of the invention to follow the internal profile of the mold further makes it possible to lower the blowing pressure needed at the blow molding step The improved geometrical structure of the proposed bottle also allows the reduction of the preform weight. Pressurized beverages conventionally use a high preform weight due to the following two reasons:

A higher wall thickness increases the barrier properties of the bottle and makes sure the intended pressure remains active for a desired period of time;

A higher base weight increases the pressure resistance.

PEF inherently provides superior barrier properties than PET and thus the remaining weight reduction constraint is the pressure resistance requirement. However, the proposed bottle provides significantly higher pressure resistance properties at the same weight which enables a preform weight reduction of up to 30% compared to standard pressurized PET bottle shapes.

The Method for Manufacturing the Bottle

The invention also proposes a method of making a bottle as previously defined according to claim 9.

Said method comprises the steps of:
providing a preform made of at least one thermoplastic polymer of at least one Furan Dicarboxylic Acid (FDCA) monomer, preferably 2,5-Furan Dicarboxylic Acid (2,5-FDCA) monomer, and at least one diol monomer, preferably Monoethylene glycol (MEG) monomer;
placing the preform in a mold having a cavity comprising at least one imprinting member;
blowing the preform in the mold to form the bottle comprising a push-up having a push-up height in the range of 7 to 10 mm for a bottle having a diameter (D) between 40 and 150 mm.

Additionally the method comprises the step of providing a preform, the preform comprises a hollow tube extending along an axis (A0) and having a closed bottom end and an opened top end, the step of blowing the preform (20) comprising blowing the preform through the opened top end at a blowing pressure less than or equal to 35 bars, preferably 30 bars, more preferably 25 bars, more preferably 20 bars, more preferably 15 bars, more preferably 10 bars.

A further step comprising filling the bottle with a liquid, preferably a beverage is proposed.

As mentioned, the bottle may be filled with a pressurized liquid, preferably a beverage. Said beverage may be a carbonated beverage. Alternatively, the beverage may also be a beverage under nitrogen atmosphere.

The beverage can be of any type, for example carbonated water, carbonated soft drinks, flavored water or fruit juice under nitrogen atmosphere . . .

Use of the Proposed Bottle

The invention also relates to the use of at least one thermoplastic polymer of at least one Furan Dicarboxylic Acid (FDCA) monomer, preferably 2,5-Furan Dicarboxylic Acid (2,5-FDCA) monomer, and at least one diol monomers, preferably Monoethylene glycol (MEG) monomer, in a bottle as previously defined.

The beverage that can be filled in the bottles can be for example carbonated water. The beverage can be an alcoholic beverage such as bier. The beverage can also be a soda for example a cola beverage, preferably carbonated. The beverage can be a fruit juice, under nitrogen atmosphere. The beverage can be a pressurized vitamin water or energy drink or any other pressurized beverage.

The Polymer Constituting the Bottle: Structure-Preparation

The polymer comprises moieties corresponding to a FDCA monomer, preferably 2,5-FDCA, and moieties corresponding to a diol monomer, preferably a monoethylene glycol. The polymer is typically obtained by polymerizing monomers providing such moieties in the polymer. To that end one can use as monomers FDCA, preferably 2,5-FDCA or a diester thereof. Thus the polymerization can be an esterification or a transesterification, both being also referred to as (poly)condensation reactions. One preferably uses dimethyl-2,5-furandicarboxylate (DMF) as a monomer.

In the preferred embodiment the diol is EthyleneGlycol (MonoEthylene Glycol-MEG), preferably biosourced. For example biosourced MEG can be obtained from ethanol which can also be prepared by fermentation from sugars, (e.g. glucose, fructose, xylose) that can be obtained from crop or agricultural by-products, forestry byproducts or solid municipal waste by hydrolysis of starch, cellulose, or hemicellulose. Alternatively, biosourced MEG can be obtained from glycerol, that itself can be obtained as waste from biodiesel.

According to a preferred embodiment of the invention, the polymer is a PEF material using biosourced 2,5-FDCA and biosourced MonoEthylene Glycol. Indeed, 2,5-FDCA comes from 5-hydroxymethylfurfural (5-HMF) which is produced from glucose or fructose (obtained from renewable resources). MonoEthylene Glycol can be obtained from ethanol which can also be prepared by fermentation from sugars, (e.g. glucose, fructose, xylose) that can be obtained from crop or agricultural by-products, forestry by-products or solid municipal waste by hydrolysis of starch, cellulose, or hemicellulose. Alternatively, MonoEthylene Glycol can be obtained from glycerol, that itself can be obtained as waste from biodiesel.

This is referred to as a 100% biobased or biosourced PEF as most of the monomers used are considered as biosourced. As some co-monomers and/or some additives, and/or some impurities and/or some atoms might not be biosourced, the actual amount of biosourced material can be lower than 100%, for example between 75% and 99% by weight, preferably from 85 to 95%. PEF can be prepared according to the public state of the art in making PEF.

Bottles may be made with such a material for example by Injection Blow Molding (IBM) processes, preferably by Injection Stretch Blow Molding (ISBM) processes. Such bottle can have similar properties than previously publicly described with PEF wherein 2,5-FDCA or MonoEthylene Glycol are not biosourced.

Such properties, including mechanical properties are improved compared to PET.

As mentioned, the term "polymer" according to the present invention encompasses homopolymers and copolymers, such as random or block copolymers.

BRIEF DESCRIPTION OF THE DRAWINGS

The invention is further described with reference to the following examples. It will be appreciated that the invention as claimed is not intended to be limited in any way by these examples.

Embodiments of the present invention will now be described, by way of examples, with reference to the accompanying figures in which.

DETAILED DESCRIPTION

As used in this specification, the words "comprises", "comprising", and similar words, are not to be interpreted in an exclusive or exhaustive sense. In other words, they are intended to mean including, but not limited to.

Any reference to prior art documents in this specification is not to be considered as an admission that such prior art is widely known or forms part of the common general knowledge in the field.

On the Figures, the same reference numbers refer to the same or similar elements.

Figure 1:
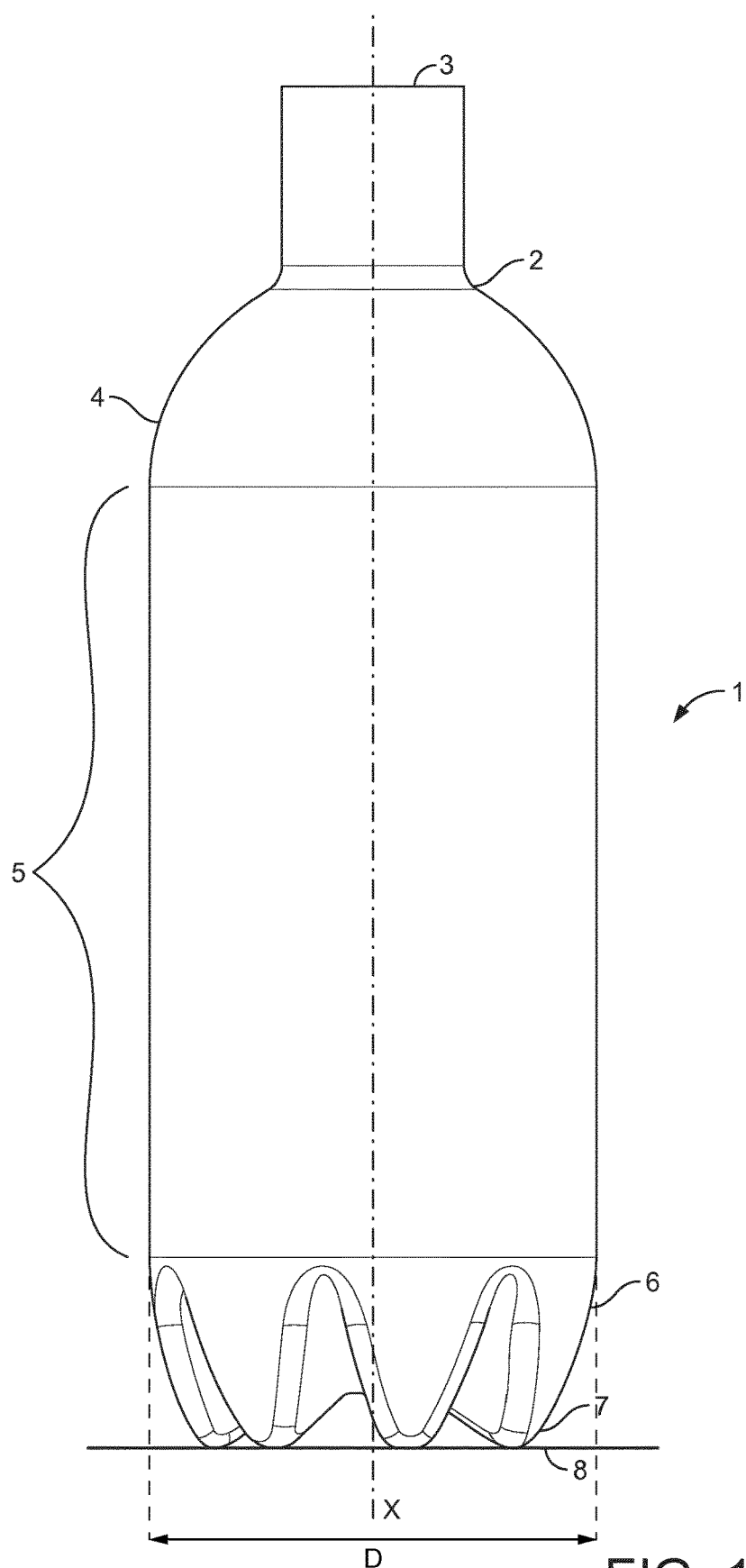
FIG. 1 is a general view of a bottle made of PEF comprising a base.

FIG. 1 shows a general view of a bottle 1, produced by Injection Stretch Blow-Molding of a preform made of PEF thermoplastic polymer.

Said bottle 1 comprises, at an upper end, a neck 2, provided with a mouth 3. In the extension of the neck 2, the bottle 1 comprises in its upper part a shoulder 4 that widens out in the direction opposite to the neck 2, said shoulder 4 being extended by a lateral wall or body 5, of a shape generally cylindrical in revolution around a main axis X of the bottle 1.

The bottle 1 further comprises a bottom 6 which extends, opposite the neck 2, from a lower end of the body 5. The bottom 6 comprises a peripheral seat 7 in the form of an annular ridge which extends substantially axially in the extension of the body 5. The seat 7 terminates in a laying plane 8 (also called seating plane) perpendicular to the axis X of the bottle 1, said seating plane 8 defining the lower end of the bottle 1 and enabling it to be seated upright on a flat surface.

In FIG. 1, D denotes the diameter of the bottle 1 laying on seating plan 8, the term "diameter" covering not only the case (illustrated) in which the bottle 1 (and thus the bottom 6) has a circular contour, but also a case in which the bottle 1 would have a polygonal contour (for example square), in which case the term "diameter" would designate the diameter of the circle in which said polygon is inscribed.

In the proposed embodiments the diameter D of the bottle 1 is between 40 and 150 mm and correspond to bottles having internal volume between 15 and 350 cl.

The bottles covered by the proposed embodiment have the functionalities of a bottle and can be handle with one hand. This may not be possible for container having higher volumes.

FIG. 2a to FIG. 2d present perspective view, bottom view, cross sectional and second perspective views of the bottom base 6 of bottle of FIG. 1 integrating the features of the invention and according to a first embodiment of the invention. FIGS. 2a to 2d will be described jointly.

In the present example, the bottle base 6 corresponds to a bottle having a diameter of 65.5 mm and an internal liquid volume of 50 cl. Bottles with such dimensions of volume and diameter made in PET are commonly found.

The bottom base 6 comprises from its peripheral part 7 to its center: the peripheral seat 7, already described, a concave arch 10, a central zone 11 and in the middle of the central zone a point called push-up 11a. The push-up 11a comprises an amorphous pellet 12 resulting from the formation of the preform (injection of plastic material for forming the preform).

The concave arch 10 has a rounded general shape. It is in the form of a substantially spherical dome with the concavity turned towards the exterior of the container 1 in the absence of stress, i.e. in the absence of contents in the container 1. The arch 10 extends from the seat 7, to the push-up 11a of the bottom 6 forming a boss projecting towards the interior of the container 1.

Figure 2A:
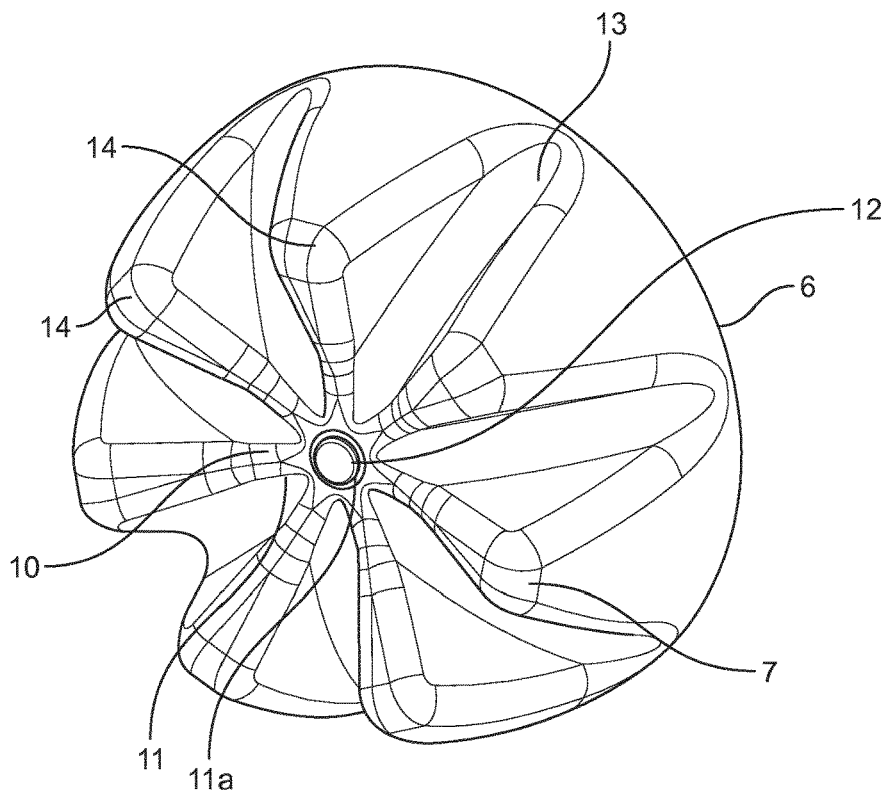
FIGS. 2a to 2d present perspective, bottom, cross-sectional and second perspective views of the proposed base according to a first embodiment of the invention.
Figure 2B:
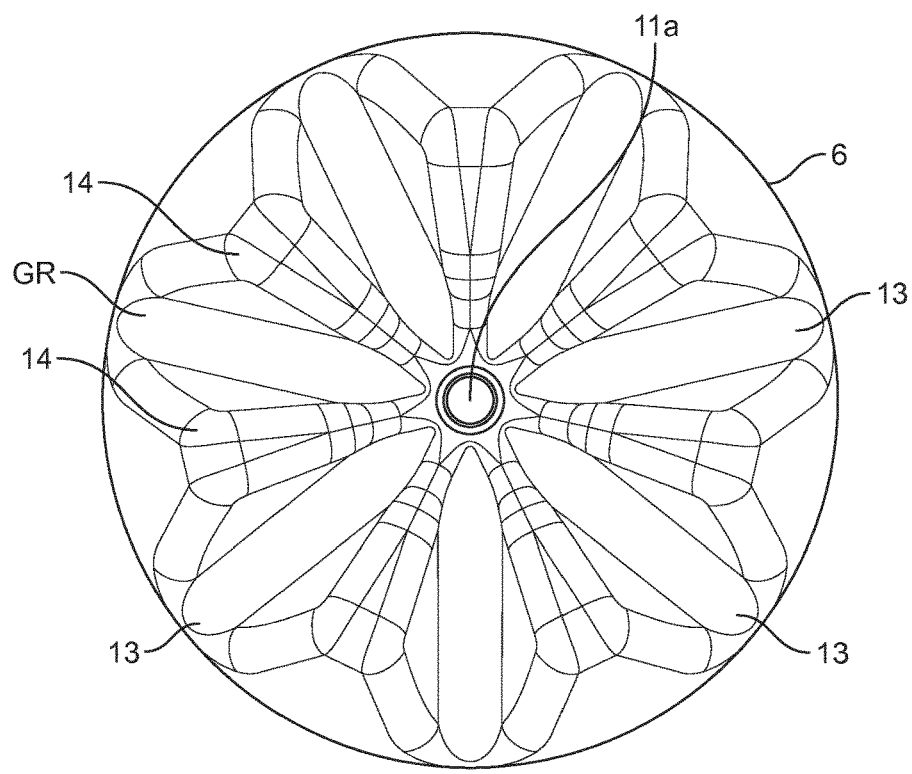
Figure 2C:
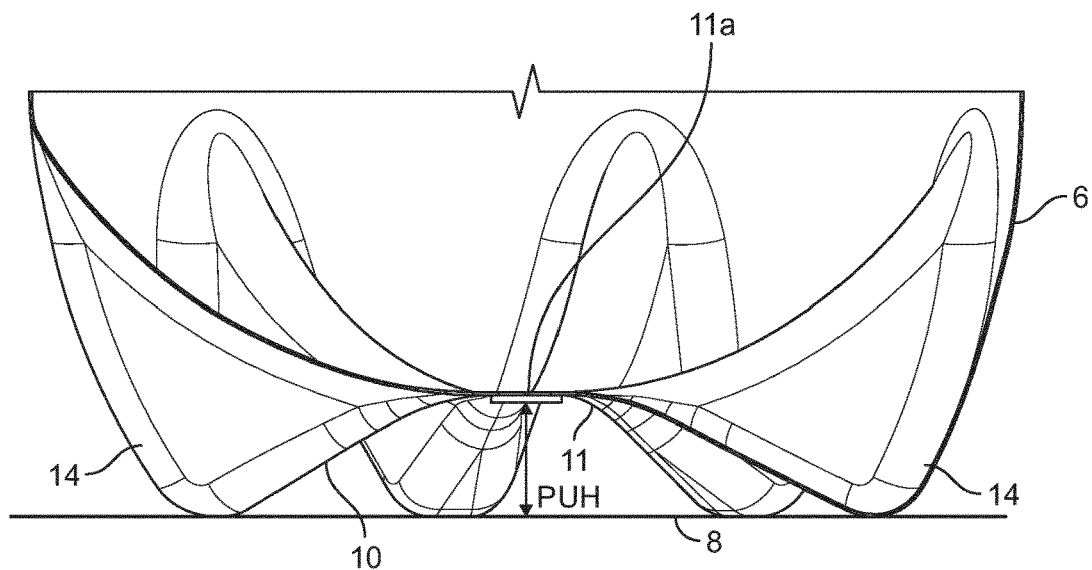
Figure 2D:
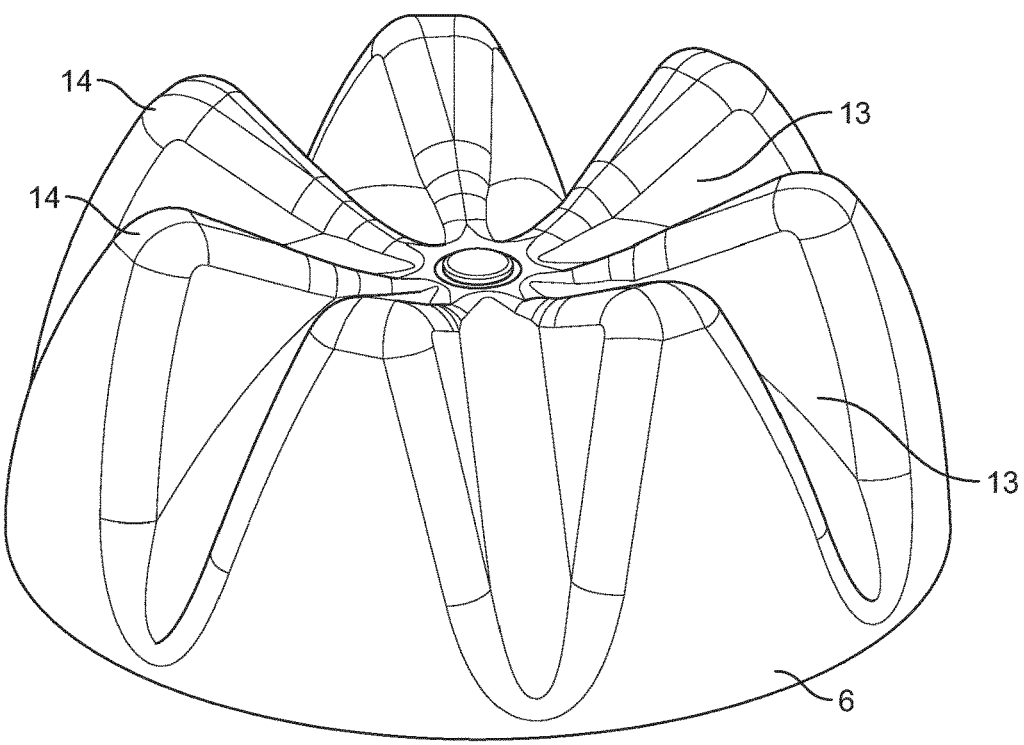

The distance of the push-up 11a with respect to the laying plan 8 is defined as push-up height PUH visible in FIG. 2c. The push-up height has a high influence on the pressure resistance of the bottom base. In the proposed embodiment presented in FIGS. 2a to 2d, the push-up height is of 8 mm.

The push-up height has some influence on two factors used for measuring the pressure resistance of the bottom base 6 of the bottle: Base clearance and gate displacement.

Base clearance is defined as the distance between the push-up 11a and the laying plan 8 which is left after 10 bars is applied in the bottle and therefore on the bottom base 6. The higher the base clearance is, the better the behavior of the bottom base vis-à-vis pressure resistance is.

Gate displacement is defined as the movement the push-up 11a does in the direction of the laying plan 8 between 0 and 10 bars. The lower the gate displacement is, the better the behavior of the bottom base is in connection with pressure resistance.

The base clearance and gate displacement are highly influenced by the push-up height. In the case of bottom base made from PEF polymer, it is possible to produce bottom bases having higher push-up height than with conventional PET bottom base.

The properties of the bottom base are then increased in what concerns pressure resistance with regards to final base clearance under target pressure.

In addition, the central zone 11 has the function of participating to a better repartition of the plastic material in the bottom base during the bi-orientation step of the injection stretch blow molding process.

As can be seen in the figures, the bottom base 6 further comprises a series of reinforcing grooves 13. Said reinforcing grooves 13 are hollow towards the interior of the container 1 and extend radially from the central zone 11 to at least the peripheral seat 7. According to a preferred embodiment, illustrated in the figures, the reinforcing grooves 13 extend beyond the seat 7, rising laterally over a lower part of the body 5 of the container 1.

In other words, the principal grooves 13 extend radially over the entire arch 10, over the peripheral seat 7 and part of the body 5. It will therefore be understood that the seating plan 8 is discontinuous because it is interrupted at each principal groove 13.

There are 7 reinforcing grooves 13 in the presented bottom base.

The reinforcing grooves have a groove radius GR, defined as the radius of the groove in the bottom of said groove that is 3 mm.

The proposed base has a groove radius that is a bit smaller than conventional ones used in PET thermoplastic bottle base while still allowing good blowability.

Furthermore, the grooves have a groove angle of 40°, this angle is the opening angle of reinforcing grooves 13.

Base feet 14 are located between two adjacent reinforcing grooves 13. Hence in the present embodiment shown in FIGS. 2a to 2d, there are 7 reinforcing grooves and 7 base feet.

The radius of the base feet 14 at the location of the laying plan 8 is of 4 mm.

Thanks to this low value of base feet radius, compared to conventional PET bottom base (6 to 8 mm), the base surface is minimized which contributes to a good blowability of the base.

Both the number of reinforcing grooves 13 and the number of base feet 14 have an influence on the pressure resistance. The higher the number of reinforcing grooves and base feet is, the better the pressure resistance is.

The use of PEF polymer for bottles and bottle bottom bases allows increasing the number of reinforcing grooves and base feet which increase the pressure resistance of the base while still allowing good blowability of the base thanks to low base feet radius and low groove radius.

Hence, as mentioned, the proposed bottle has improved technical features over bottles of the prior art.

The proposed bottle can be filled with any type of pressurized liquid, especially beverage, whatever the pressure is within the range of 0.2 bar to 15 bar.

In the proposed base, the pressure resistance is increased by 30% in comparison to base having high pressure resistance made of PET.

As a summary, the proposed bottom base has the following features!

| | |
|---|---|
| Push-up height | 8 mm |
| Number of reinforcing grooves | 7 |
| Groove radius | 3 mm |
| Groove angle | 40° |
| Number of base feet | 7 |
| Base feet radius | 4 mm |

Figure 3A:
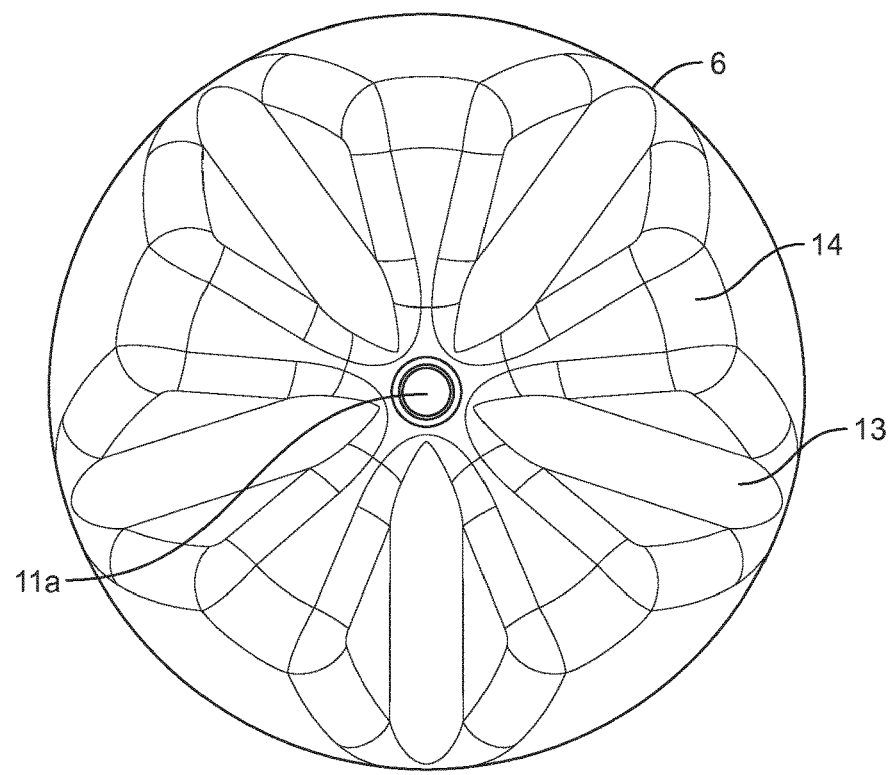
FIGS. 3a and 3b present bottom and perspective views of the proposed base according to a second embodiment of the invention.
Figure 3B:
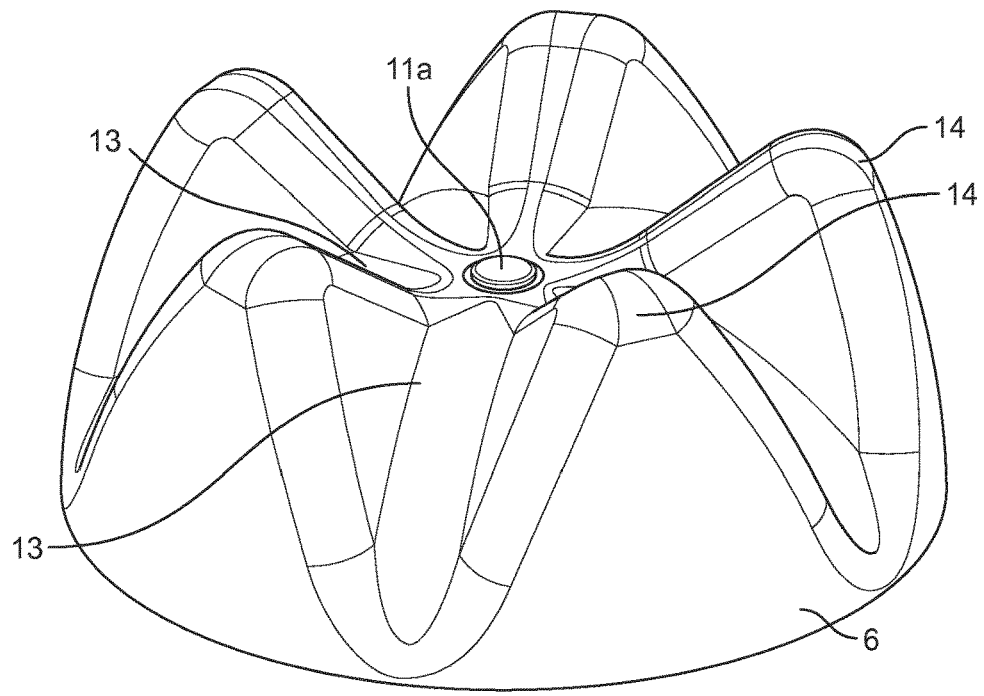

FIGS. 3a and 3b show bottom and perspective views of a bottom base 6 of a bottle according to a second embodiment of the invention.

In this embodiment, the proposed base has the following features.

| | |
|---|---|
| Push-up height | 10 mm |
| Number of reinforcing grooves | 5 |
| Groove radius | 3.7 |
| Groove angle | 60° |
| Number of base feet | 5 |
| Base feet radius | 5 |

The base of FIGS. 3a and 3b made from PEF, has a push-up height of 10 mm of this base. This value of push-up height is higher than what can be obtained with a base made of PET. It allows increasing pressure resistance of the bottle.

Figure 4A:
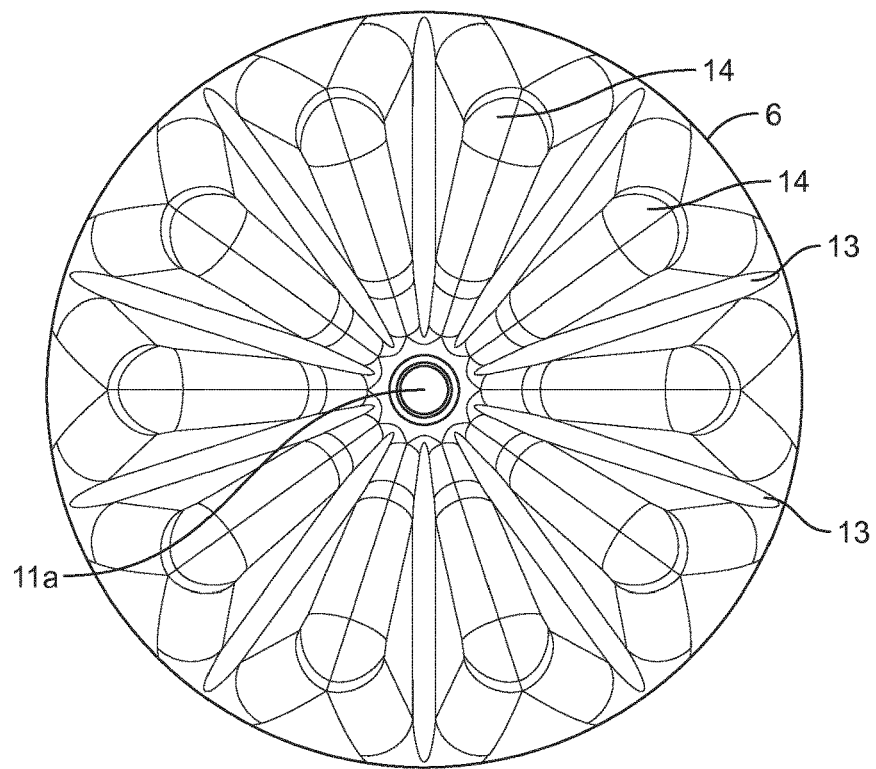
FIGS. 4a and 4b present bottom and perspective views of the proposed base according to a third embodiment of the invention.
Figure 4B:
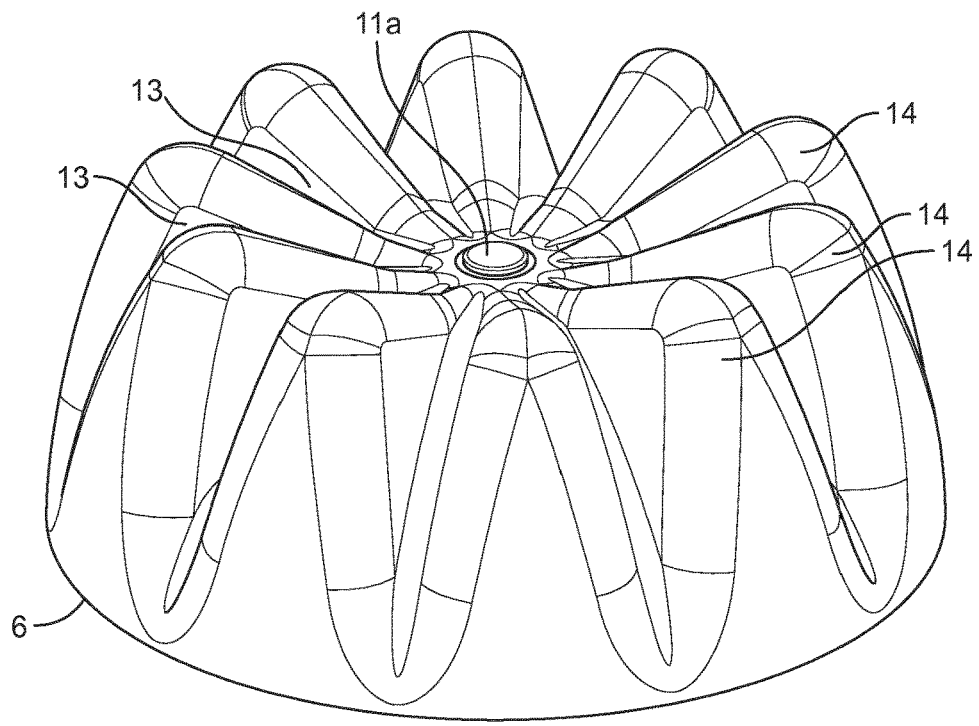

FIGS. 4a and 4b show bottom and perspective views of a bottom base 6 of a bottle according to a third embodiment of the invention.

In this embodiment, the proposed base has the following features.

| | |
|---|---|
| Push-up height | 7 mm |
| Number of reinforcing grooves | 10 |
| Groove radius | 1 |
| Groove angle | 32° |
| Number of base feet | 10 |
| Base feet radius | 5 |

The base of FIGS. 4a and 4b has a push-up height of 7 mm and a number of reinforcing grooves of 10. Due to this high number of grooves, the groove angle is limited to 32°. The bottle incorporating the proposed base is made of PEF which allows the polymers to flow into and correctly forms the reinforcing grooves 13.

The proposed bottles and bottle bottom bases are blown from preforms.

Such preforms comprise a hollow tube extending along a longitudinal axis and having a closed bottom end and an opened top end. These preforms designs are well known to the skilled person in the art.

The forming of a bottle comprises the step of blowing the preform comprising heating the preform at a temperature above its Tg (glass transition temperature), placing the preform in a mold, stretching the preform using a stretch road and blowing the preform using an incompressible fluid through the opened top end at a blowing pressure less than or equal to 35 bars, preferably 30 bars, more preferably 25 bars, more preferably 20 bars, more preferably 15 bars, more preferably 10 bars.

The preforms used for making the bottles of the invention are made of PEF made from FDCA and diol monomers.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A bottle molded from at least one thermoplastic polymer of at least one Furan Dicarboxylic Acid (FDCA) monomer, and at least one diol monomer, the bottle, having a main axis, being provided with a body and a bottom base extending from a lower end of the body, the bottom base comprising:
   a peripheral seat defining a laying plane;
   a concave arch which extends from the periphery of a central zone of the bottom base to the peripheral seat, the concave arch having a rounded general shape with a concavity turned towards the outside of the container and the middle point of the central zone being named push up;
   a series of reinforcing grooves which extend radially from the central zone to at least the peripheral seat;
   base feet located between two adjacent reinforcing grooves; and
   the bottle bottom base comprises a push-up height, defined as the height between the push-up and the laying plan, is in the range of 7 to 10 mm for a bottle having a diameter between 40 and 150 mm.

2. A bottle according to claim 1 comprising a number of reinforcing grooves from 5 to 10.

3. A bottle according to claim 1, in which the reinforcing grooves have a groove radius comprised within the range from 1 to 6 mm.

4. A bottle according to claim 1, further comprising from 5 to 10 base feet.

5. A bottle according to claim 1, in which the radius of the base feet at their contact point with the laying plan is from 1 to 8 mm.

6. A bottle according to claim 1, having an internal volume between 15 to 350 cl.

7. A bottle according to 1, being filled with a pressurized liquid.

8. A bottle according to claim 7, in which the beverage is a carbonated beverage or a beverage bottled under nitrogen atmosphere.

9. A method of making a bottle comprising the steps of:
   providing a preform made of at least one thermoplastic polymer of at least one Furan Dicarboxylic Acid monomer, and at least one diol monomer;
   placing the preform in a mold having a cavity comprising at least one imprinting member; and
   blowing the preform in the mold to form the bottle comprising a push-up having a push-up height in the range of 7 to 10 mm for a bottle having a having a diameter ED) between 40 and 150 mm.

10. A method according to claim 9, wherein at the step of providing a preform, the preform comprises a hollow tube extending along a longitudinal axis and having a closed bottom end and an opened top end, the step of blowing the preform comprising blowing the preform through the opened top end at a blowing pressure less than or equal to 35 bars.

11. A method according to claim 9, further comprising a step of filling the bottle with a liquid.

* * * * *